(12) United States Patent
Furlong et al.

(10) Patent No.: US 7,324,542 B2
(45) Date of Patent: Jan. 29, 2008

(54) MULTICAST DISTRIBUTION OF STREAMING MULTIMEDIA CONTENT

(75) Inventors: Jeff Furlong, Grand Bay-Westfield (CA); Robert Laughlin Cookson, Quispamsis (CA)

(73) Assignee: Alcatel Lucent, Paris (FR)

(*) Notice: Subject to any disclaimer, the term of this patent is extended or adjusted under 35 U.S.C. 154(b) by 575 days.

(21) Appl. No.: 11/037,122

(22) Filed: Jan. 19, 2005

(65) Prior Publication Data
US 2006/0159117 A1    Jul. 20, 2006

(51) Int. Cl.
*H04J 3/26* (2006.01)
(52) U.S. Cl. .............. 370/432; 370/401; 370/352; 370/390
(58) Field of Classification Search .......... None
See application file for complete search history.

(56) References Cited

U.S. PATENT DOCUMENTS

2004/0090959 A1*  5/2004  Cinghita et al. ........... 370/390
2005/0097470 A1*  5/2005  Dias et al. ................. 715/723

OTHER PUBLICATIONS

Deering, S., Host Extensions for IP Multicasting, Stanford University Network Working Group, Aug. 1989.

* cited by examiner

*Primary Examiner*—Duc Ho
(74) *Attorney, Agent, or Firm*—Kramer & Amado, P.C.

(57) ABSTRACT

For offering entertainment services by video streaming content to users, a video encoder creates the required .nsc file for each broadcast channel. This .nsc file is retrieved and stored on a server which notifies each set-top box in the field, via a multicast notifier of the availability of the new service. This notifier contains the multicast address and port to where the .nsc files are being streamed. Once the set-top box retrieves this notification, it attempts to join the dedicated multicast stream, download the .nsc files and store them locally in memory on the set-top box. When a user selects a broadcast channel from their lineup, the set-top box will access the local file to obtain the proper information about that particular ASF stream; hence, it will not have to do an HTTP retrieval.

16 Claims, 6 Drawing Sheets

MULTICAST DISTRIBUTION OF STREAMING MULTIMEDIA CONTENT

RELATED U.S. PATENT APPLICATIONS

This patent application is related to U.S. patent application entitled "Digital interactive delivery system for TV/multimedia/Internet, Ser. No. 09/663,973, filed on Sep. 28, 2000, now abandoned in favor of a CIP SN N/A; and to U.S. patent application, entitled "Digital interactive delivery system for TV/multimedia /internet with on-demand applications", Ser. No. 09/676,701 filed on Nov. 29, 2000, both assigned to Alcatel, Inc., which are incorporated herein by reference.

FIELD OF THE INVENTION

The invention is directed to accessing entertainment content over communication networks, and in particular to multicast distribution of streaming multimedia content over an IP network.

BACKGROUND OF THE INVENTION

Video streaming is achieved by multiplexing and synchronizing coded video into a single bit stream or multiple bit streams for transmission or storage purposes. Streaming is used for distribution of video media because media files tend to be large and the duration of a mere download can be very large. To view a media file that is not streamed, users must first download the file to a local hard disk-which may take minutes or even hours-and then open the file with player software that is compatible with the file format. Streaming enables real-time delivery of the content, since the content of the stream can be played while still in the process of being downloaded. To view the content, the user's browser opens player software, which buffers the file for a few seconds and then plays the file while simultaneously downloading it. Also, streaming media files are not stored locally on a user terminal; typically the parts of the content are discarded once used (viewed).

Prior to streaming, the content must first be encoded, a process which accomplishes a) conversion of the content from analog to digital form (if necessary), b) creation of a file in the format recognized by the streaming media server and player, then c) compression of the file to minimize the bandwidth necessary for transmission from the server to the client, while d) adopting a bit rate at which the content is to be delivered. Service providers typically choose to encode content at multiple rates for enabling access to a variety of subscribers. MPEG is a standardization group for video and audio compressions. For example, MPEG-2-based digital television standard defines formats for cable, satellite, and terrestrial video broadcast.

Streaming media formats used today include for example RealNetworks RealSystem G2, Microsoft Windows Media Technologies ("WMT"), and Apple QuickTime. Microsoft's Windows Media 9 (WM9) is a de/compression application used by the entertainment industry for streaming multimedia platforms. This format busts compression to deliver high-definition video and handles surround sound in the DVD audio environment. It supports encoding of video data that ranges from high definition (HD) quality (1080i/1080/p) to low-data-rate screen capture, and audio from multichannel to voice-only content. Since the DVD Forum has given approval to the WM9 as a mandatory component of the DVD specification standard for HD video, this format has the potential to be extensively used in the emerging field of multicast distribution of streaming multimedia content.

In order for the WM9 format to be adopted by the cable and satellite industries it need to be carried in an MPEG2-TS. The IP Broadband service provider can easily pass this pre-encoded bandwidth friendly content through his network if he is using MPEG2-TS as well. Otherwise, the service provider will have to demultiplex the MPEG2-TS VC9 services and remultiplex new WM9/ASF based services based in real-time. This will increase costs and complexity and decrease robustness. This remultiplex operation way not even be effective.

Windows Media 9 (WM9) streaming system makes use of a file format known as ASF (Advanced Streaming Format) for packaging multimedia content. An ASF file container stores audio, multi-bit-rate video, metadata such as title and author, and index and script commands, such as Universal Resource Locators (URLs) and closed captioning. The file container supports files as large as 17 million terabytes. By using distinct file extensions (.wma, .wmv, .A) users can install multiple players on their system, using e.g. one extension to play only audio and one for playing video. Audio and video content compressed with a wide variety of codecs (coding/decoding devices) can be stored in an ASF file and played back with a Windows Media Player, provided appropriate codecs are installed on the user terminal, equipped with Windows Media Services or optionally packaged with Windows Media Rights Manager.

ASF format has the potential of becoming widely adopted by the video entertainment industry, because it supports data delivery over a wide variety of networks protocols, while still being suitable for local playback. It also supports advanced multimedia capabilities including extensible media types, component download, scalable media types, author-specified stream polarization, multiple language support, and extensible bibliographic capabilities, including document and content management.

ASF provides for segmentation of the multimedia streams into individual data packets, multiplexes the packets, and time synchronizes the streams as required for presentation. A header, known as an ASF header, is placed at the beginning of the file, and contains important information required to decode the stream. Thus, the header provides means of identifying individual component streams and the packets which belong to these streams; information on the video codec configuration (e.g. WM9) required to initialize the video decoder; information on the audio codec configuration required in order to initialize the audio decoder, and DRM (Digital Rights Management) information required to acquire licenses and decrypt the stream.

For large amounts of data to be distributed to a large number of subscribers, IP multicast is more efficient than normal Internet transmissions because a server can broadcast data/messages to many recipients simultaneously. Unlike traditional Internet traffic that requires separate connections for each source—destination pair, IP multicasting allows many recipients to share the same source. This means that just one set of packets is transmitted for all destinations. To receive a multicast, a subscriber listens to a specific IP address on a multicast-enabled network, like tuning a television to a specific channel.

Internet Group Management Protocol (IGMP) is defined in RFC 1112 as the Internet standard for IP multicasting. IGMP establishes host memberships in particular multicast groups on a single network and allows a host to inform its local router that it wants to receive data addressed to a specific multicast group. Multicast broadcast is particularly suitable for distribution of multimedia (video, audio, data) content.

However, unlike a unicast stream, no header information is contained in a multicast stream, since the multicast stream is continuous and must support random access. In order to address this problem, Microsoft mandated the distribution of the information in the ASF header through an alternative mechanism known as a Windows Media Station file, or an .nsc file. A .nsc file contains in addition to the information in the ASF header, information specific for connecting and playing a multicast stream, such as the multicast IP group address, multicast port, stream format, and various station settings. A Windows Media Player usually opens an announcement (.asx, .wax, or .wvx) file first, that points it to the location of the nsc file.

Currently, .nsc file distribution is done via the HyperText Transfer Protocol (HTTP), which is an application layer protocol (OSI layers) defining a set of rules for exchanging text, graphic images, sound, video, and other multimedia files on the Web. HTTP is not ideal for a broadcast TV solution, due to scalability issues as well as channel changing latency issues. This is because an .nsc file needs to be retrieved over HTTP on each channel change, meaning that the subscriber set-top box (STB) has to access a server and get the information before initiating the channel change. Also, HTTP is a unicast protocol, so that if many STBs are changing channels at the same time, scalability issues may emerge.

SUMMARY OF THE INVENTION

It is an object of the invention to provide a system and method for distribution of streaming multimedia content that alleviates totally or in part the drawbacks of the prior art multimedia distribution systems.

It is another object of the invention to provide a system and method for distribution of streaming multimedia content that transports the broadcast channels over an IP network using a multicast protocol.

There is also an object of the invention to provide a solution that addresses the need to eliminate the latency and scalability concerns introduced by the HTTP retrieval of .nsc files.

Accordingly, the invention provides a method of delivering broadcast channels to subscriber terminals over a broadband network, each broadcast channel comprising a multicast data stream, the method comprising: storing at each subscriber terminal a set of .nsc files, each .nsc file comprising information necessary for accessing and playing a respective broadcast channel that is part of a current channel line-up available at said subscriber device; receiving at said subscriber device a multicast notifier advertising a new broadcast channel (or change to the existing channels), and providing a multicast address for a channel data multicast group, including channel data for said new broadcast channel; joining said channel data multicast group for retrieving the channel data for said new broadcast channel including a new .nsc file, wherein said new .nsc file is stored locally at said subscriber device for accessing and playing said new broadcast channel.

The invention also provides a method of delivering broadcast channels to subscriber devices over a broadband network, each broadcast channel comprising a multicast data stream, the method comprising: providing an open media platform (OMP) for managing a group of subscriber terminals and storing on said OMP a set of *nsc files, each .nsc file comprising information necessary for accessing and playing a respective broadcast channel; multicasting (110) a channel data multicast group, including channel data for a set of broadcast channel subscribed for by one or more subscriber devices of said group of subscriber devices; and broadcasting (115) a multicast notifier with a respective multicast address for said channel data multicast group, wherein each .nsc file comprises information specific for accessing and playing said multicast data stream for the respective broadcast channel.

According to still another aspect of the invention, there is provided a subscriber terminal for playing broadcast channels received over a broadband network, each broadcast channel comprising a multicast data stream, comprising: means for storing (9) a set of .nsc files, each .nsc file comprising information necessary for accessing and playing a respective broadcast channel that is part of a current channel line-up available at said subscriber device; means for processing (45) a multicast notifier advertising a new broadcast channel, and providing a multicast address for a channel data multicast group, including channel data for said new broadcast channel; means for joining (48) said channel data multicast group for retrieving the channel data for said new broadcast channel, including a new .nsc file, wherein said new .nsc file is stored on said means for storing, for enabling accessing and playing said new broadcast channel.

The invention is also directed to an open media platform (OMP) for managing delivery of broadcast channels to a group of subscriber devices over a broadband network, each broadcast channel comprising a multicast data stream. The OMP comprises means for storing (10) on said OMP a set of .nsc files, each .nsc file comprising information necessary for accessing and playing a respective broadcast channel; means for multicasting (39) a channel data multicast group, including channel data for a set of broadcast channel subscribed for by one or more subscriber devices of said group of subscriber devices; and means for broadcasting (25) a multicast notifier with a respective multicast address for said channel data multicast group, wherein each .nsc file comprises information specific for accessing and playing said multicast data stream for the respective broadcast channel.

It is advantageous to store the .nsc files locally on the STB (set-top box), so that the STB does not have to access a server every time a respective subscriber changes the channel. This approach reduces the scalability and latency issues introduced when the .nsc files are located on a server.

In addition, since delivery and distribution of .nsc files to the STBs is performed using a multicast broadcast solution, the system according to the invention results in improved performance and scalability of video media distribution to subscribers as compared to the existing unicast broadcast solution.

Still another advantage of the invention resides in the ability to provide each STB in the field with a notification message indicating the multicast address and port from which to obtain the .nsc files, which provides information necessary for a subscriber terminal to readily join a given multicast. In this way, the STB does not have to access an often time faraway .asx announcement server for retrieving this information.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

Figure 1:
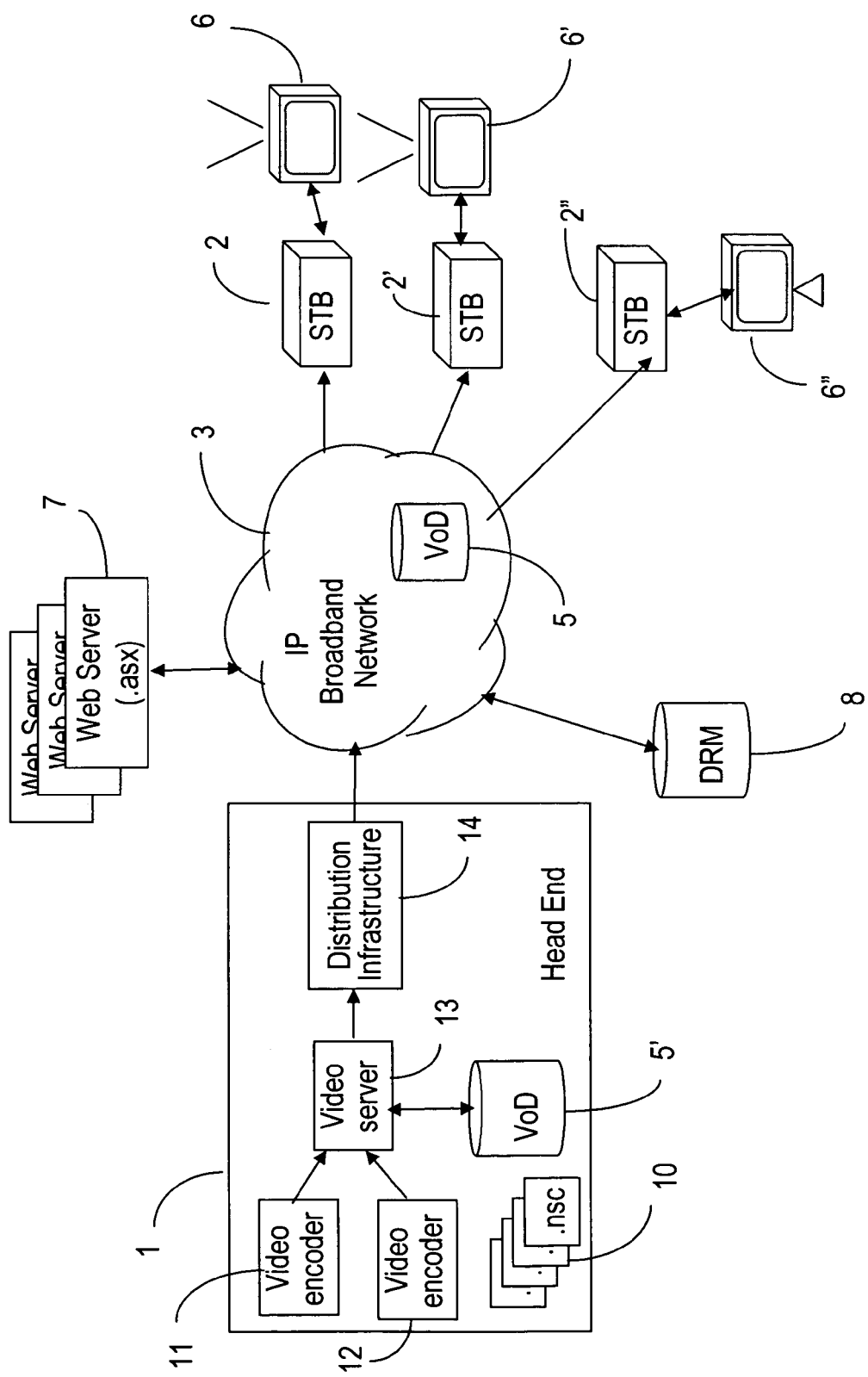
FIG. 1 illustrates the architecture of a solution used currently for delivering video content to subscribers.

FIG. 1 shows the architecture of a video solution used currently for delivering video content to subscribers. The ensuing description of FIG. 1 is provided for defining some terms used in this specification and for enabling a better understanding of the advantages of the invention.

The term 'video content' is used for multi-media (video, audio, text) data that is streamed to subscribers for providing personalized entertainment services. The architecture shown in FIG. 1 comprises a head end 1 and a plurality of set-top boxes 2 (also referred to as clients, subscribers, or video terminals), connected over a broadband IP network 3.

The head end 1 is shown schematically as including a plurality of video encoders 11, 12 (only two shown in FIG. 1), which provide for live and off-line encoding of audio and/or video services. These could be for example Windows Media 9 Encoders, enabled with multicast services. The encoders are directly managed by a video server 13, for this example a Windows Server running Windows Media Services. A content distribution infrastructure 14 (e.g. distribution servers) is also preferably provided at the head end 1, for distributing the .nsc files 10. Although .nsc files do not represent significant bandwidth, large deployments require a distribution system 14 to support channel surfing and other interactive services.

The transport and access network 3 provides the infrastructure that links the head end 1, Video on Demand (VoD) servers 5, 5', and other necessary equipment/applications, such as the servers 8 for Digital Rights Management (DRM), with the video decoders on client STB's 2. Network 3 includes all routers, switches, long haul and metropolitan transport, and access systems necessary for transporting the video streams and the associated management and license data. Thus, network 3 supports transport of video-on-IP unicast and multicast content, and could be IP router and switch based, where IP multicast replication is accomplished by core and edge routers.

The edge routers of network 3 are provided with IGMP (Internet Group Management Protocol) to enable IGMP switching for IP Multicasts, Broadcast Television and the special IP multicast information. QoS for subscriber services is implemented using IP queuing in the edge router. For example, highest priority may be given to Video on Demand and Broadcast Video while lower priority is given to High Speed Internet. The edge routers may also be enabled with static routing of most popular broadcast channels to improve channel change times.

It is also to be noted that the broadcast content may be supplied from several head-ends 1. Preferably, a unique VLAN is assigned to each subscriber to provide a level of security against IP spoofing. Subscriber VLANs could be aggregated at the edge routers on both ATM and Gigabit Ethernet interfaces depending on the type of connected DSLAM (digital subscriber line access multiplexer). A single permanent virtual channel (PVC) is provisioned on each DSL (digital subscriber line) port, for use by all available services, such as broadcast TV (BTV), Video-on-Demand (VoD), high speed Internet (HSI), etc. VoD preferably follows a distributed architecture with servers carrying the newest and most popular content at points of presence which are close to the edge.

DHCP (Dynamic Host Configuration Protocol) is used for IP address assignment for both the STB and subscriber PCs (Personal Computers); for example private IP addresses are assigned to STBs, while public addresses are assigned to PCs. IP unicast and User Datagram Protocol (UDP) is used to transport VoD from the servers to the STB. The invention also uses UDP instead of TCP for accessing the .nsc server. The UDP is a connectionless protocol, which like Transmission Control Protocol (TCP), runs on top of IP networks. But unlike TCP/IP, UDP/IP is a minimal transport network protocol that provides very few error recovery services, offering instead communications services not available from TCP, such as e.g., multicast or broadcast delivery. In addition, UDP allows a large number of set-top box (STB) connections through the server.

Distribution of content from the head end 1 to STB 2 implies announcing the clients of the multicast service, enabling the clients to signal a desire to join a multicast service, and delivery of the multicast service to clients. In the embodiment shown in FIG. 1, announcement of a multicast service is accomplished by creating an announcement file (.asx), which is provided to the client in a number of unicast ways, such as e.g. e-mail, web page and shared folders. Use of the .asx file mechanism is intended for flexible service announcement distribution, which is compatible with third party browsers, as it does not involve the respective head end server.

Web servers 7 are included in FIG. 1 to represent the distribution of .asx files. The announcement file is simply metadata containing a URL (Universal Resource Locator). URL is an address format used by a Web browser for locating an Internet resource for the purposes of accessing that file from another computer on a network. In this case, the URL points to an .nsc file, which in turn contains metadata regarding the actual service.

To join a multicast group, the client retrieves the URL pointing to the multicast information file (.nsc) from the .asx file and then retrieves the .nsc file in order to acquire the IP address and port of the multicast service. The .nsc file also contains video, audio and stream format information (i.e. program specific information), which the STB requires in order to decode the service. If the stream is a Windows Media ASF (Advanced Systems Format) stream, this information is only available at the initiation of the service in the ASF header.

Figure 2:
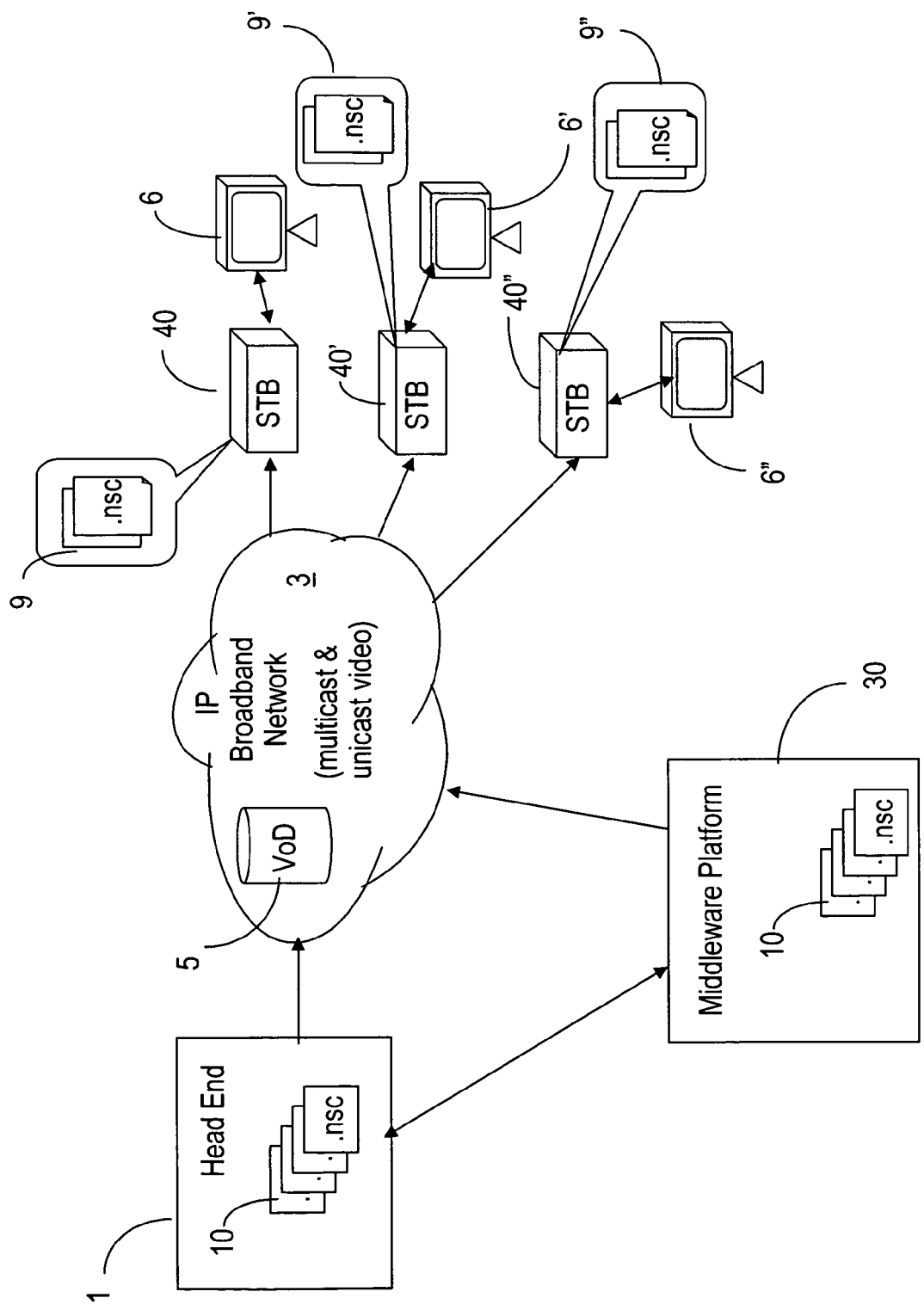
FIG. 2 illustrates the architecture of a solution for delivering video content to subscribers according to the invention.

FIG. 2 illustrates the architecture of a video solution according to the invention. In this architecture, a middleware platform 4 is provided to undertake some of the functionality accomplished by the head-end 1 in the example of FIG. 1, for improving the overall latency and scalability issues resulting from having most video services concentrated at the head-end, as in the solution of FIG. 1.

The middleware platform 4 provides the tools that are necessary to effectively manage the delivery of entertainment and rich content services. This platform is an open and flexible platform that delivers unlimited channels of digital TV, Video on Demand, Personal Video Recorder, Pay Per View, Electronic Program Guides, and other rich content services. Platform 4 enables service providers to create highly competitive multi-media entertainment services, designed for their market and their customers' demands. Using industry standard technology, service providers can extend the middleware platform 4 and take advantage of HTML, Java Server Pages (JSPs) and custom JSP Tag libraries and XML interfaces to extend or create new applications.

Relevant to this invention, the middleware platform 4 provides effective and scalable announcements of the multicast services available to a subscriber, and also provides the STBs with the .nsc files necessary for viewing the video content they have the right to. The announcements are multicast in the form of a 'multicast notifier' to all STBs managed by the middleware platform 4. The channels with the announcements regarding the multicast services are distributed to the edge routers in the same manner as broadcast TV. This method of announcement negates the requirement for Web servers 7 shown in FIG. 1.

The IP based subscriber device 40, also referred to as 'set-top box (STB)' enables operational teams to remotely activate and deactivate services, perform upgrades, diagnosing and troubleshooting from a network operation center. It is to be noted that the term 'set-top box (STB)' or 'subscriber device' generically refers herein to the hardware (HW) and software (SW) provided at a subscriber end that enables the subscriber to connect to network 3 for downloading video content of interest. The STB may be provided as a separate box, or may an integral part of a personal computer or any data device equipped with a display.

Relevant to this invention is the ability of the STBs to receive and process the notifiers addressed to it and to join the respective channel data multicast group based on the multicast address provided by the notifier. The STB then retrieves the IPG and channel data, including the .nsc information. The .nsc files broadcast multicast to the STBs 40, 40', 40" with the IPG data, are stored locally. Additional memory resources are needed at th4e STB to store these files, as intuitively shown at 9, 9' and 9".

Figure 3:
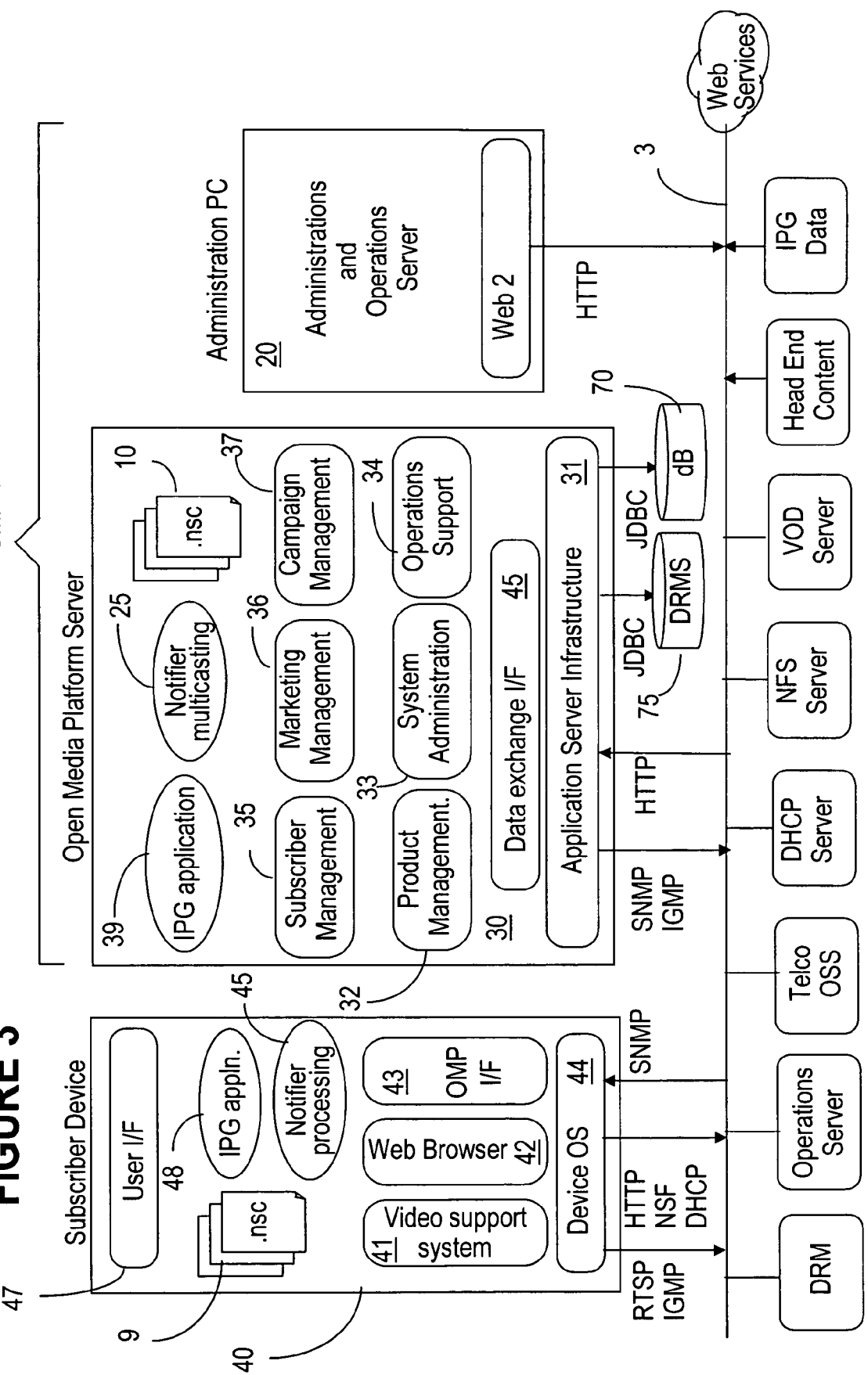
FIG. 3 illustrates an example of the block diagram of the middleware platform and subscriber device platform of FIG. 2.

FIG. 3 shows the block diagram of an embodiment of the middleware platform 4, including an open media platform (OMP) server 30 and a service administration tool (an administration PC) 20. FIG. 3 also shows the block diagram of an embodiment of the STB (set-top box) platform 40 (also referred to as the subscriber platform).

Service Administration tool 30 manages the subscribers and the video content. Existing billing and provisioning applications are preferably integrated to the OMP (open media platform) database 70 using industry standard interface technologies, enabling service administrators to work with their current customer relationship management (CRM) tools and deactivate services, upgrade, diagnose and troubleshoot IP-based client devices, all from a network operation center. A web browser 31 enables provisioning of various services over the Internet 3.

OMP server 30 leverages client software on the STB to enable service providers to create, manage and deliver consumer proven, revenue generating entertainment services. Application Server Infrastructure 31 enables most existing web video applications; FIG. 3 shows some of them namely DRM (digital rights management), DHCP (dynamic host configuration protocol) servers, NFS (network file system) servers, head end content, telco operating systems, VoD servers, emerging web services, etc. A data exchange interface 45 enables connection of the OMP (open media platform) server 30 to network 3.

In general terms, tools 32-37 manage business operations and client-side applications such as broadcast television, Interactive Program Guides, Pay-Per-View, and integrated Web browsing. OMP server 30 may be also equipped with a Movie Manager (not shown) to allow the service provider to build an on-demand service for customers to preview, purchase, and play on demand content. Service providers decide how users access on demand content and design the look and feel of user interfaces.

Relevant to this invention, server 30 includes a notification agent 25 that sends the multicast notifier to each STB under its management, advertising new channels, or new groups of channels. As noted above, the notifier contains the multicast address and port to where the .nsc files are being streamed.

FIG. 3 also shows the IPG server application 39 that provides a subscriber with the ability to channel browse for TV programs and/or web sites and order pay-per-view programs, to schedule for automatic viewing/recording of available channels, etc. The IPG contains comprehensive information regarding multicast services including their IP address, port, systems layer (MPEG1-SS, MPEG2-TS) and service description (Audio/Video, Audio-Only) etc. Details of its operation are provided in the co-pending U.S. patent applications Ser. Nos. 09/675,849, and 09/676,701 identified above. Also the OMS server 30 uses a digital rights management server (DRMS) 75 which generates and distributes the licenses to the subscribers. Relevant to the invention, the .nsc file information is received from the head-end, processed and distributed as part of the application 39 that manages the IPG and channel data.

The IP based subscriber device 40 comprises general purpose applications such as the device operating system 44, a video support system 41, a web browser 42, and interfaces 43 and 47 with the OMP server 30 and the subscriber, respectively. The video support system 41 includes the codec for decoding the video content, the HW and SW for supporting high picture quality (using e.g. DSP-based software implementations), SDTV/HDTV, etc. The video content is retrieved over network 3 from various sources, as discussed above, using preferably the ASF format. The web browser 42 enables connection to the Internet. The OMP interface 43 includes the HW and SW for communication with the open media platform server 30. As indicated above, a single PVC (permanent virtual connection) is used on each DSL port, which is used now also by the open media platform.

Subscriber device 40 includes a processor 45 that processes the multicast notifier delivered from the OMP server 30 once a new channel is being broadcast. Processor 45 determines if the notifier advertises new channel data available to that subscriber device. If yes, the STB 40 joins the broadcast channel data multicast group to retrieve the channel data, including NSC files and stores them locally.

Subscriber device 40 also includes an IPG client application 48 that enables the subscriber device to retrieve the .nsc files broadcast multicast by the OMP server 30 and to store these files locally as shown at 9. This operation takes place in response to the subscriber device 40 receiving from open media platform server 30 a respective multicast notification advertising a new channel or group of channels available to the respective subscriber. Note that the subscriber device will contain only the .nsc files for decoding channels on its channel line-up.

Figure 4:
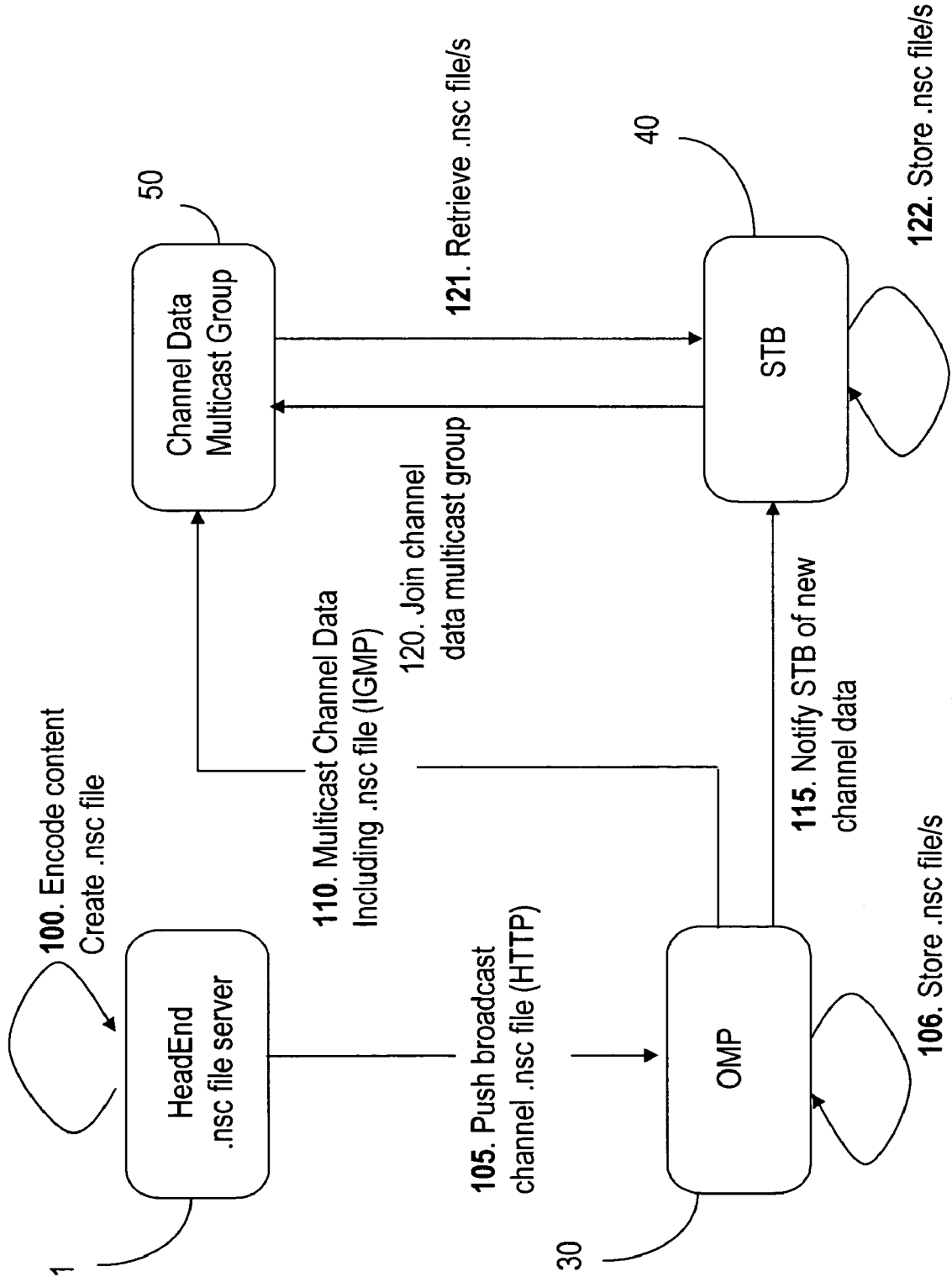
FIG. 4 is a flowchart of a method of distributing the .nsc files according to the invention.

FIG. 4 shows the flowchart of the method of distributing the .nsc files to the STBs according to the invention. As illustrated at step 100, the encoder at the head end 1 creates the required .nsc file for each broadcast channel. The head end .nsc file server pushes the broadcast channel .nsc files to the OMP 30 as necessary, using an HTTP interface. The .nsc file/s is/are retrieved by all middleware platforms, step 105, and stored on the OMP server 30, step 106. As necessary, the OMP server updates the channel data that is continuously multicast including the broadcast channel .nsc files, using IGMP, as shown in step 110. The channel data multicast group 50 represents the channels in the defined channel line-up mapped to multicast addresses necessary to receive the video for those channels. As stated before, the channel data 50 is multicast to the STB and stored locally to allow the STB to efficiently access these channels. The .nsc file information is included in this data.

Once the new broadcast channel data is being multicast, OMP server 30 notifies in turn each set-top box 40 in the field, via the multicast notifier, of the available channels, step 115. As also indicated above, the multicast notifier contains the multicast address and port to where the .nsc files are being streamed. Once the set-top box 40 retrieves this notification, it attempts to join the dedicated channel data multicast group 50, step 120. If successful, the STB retrieves the channel data including the .nsc files, step 121, and stores the .nsc files locally in the STB memory 9, step 122. When a user selects a broadcast channel from their lineup, the STB will access the local .nsc file to obtain the proper information about that particular ASF stream; hence, it will not have to do an HTTP retrieval.

Figure 5:
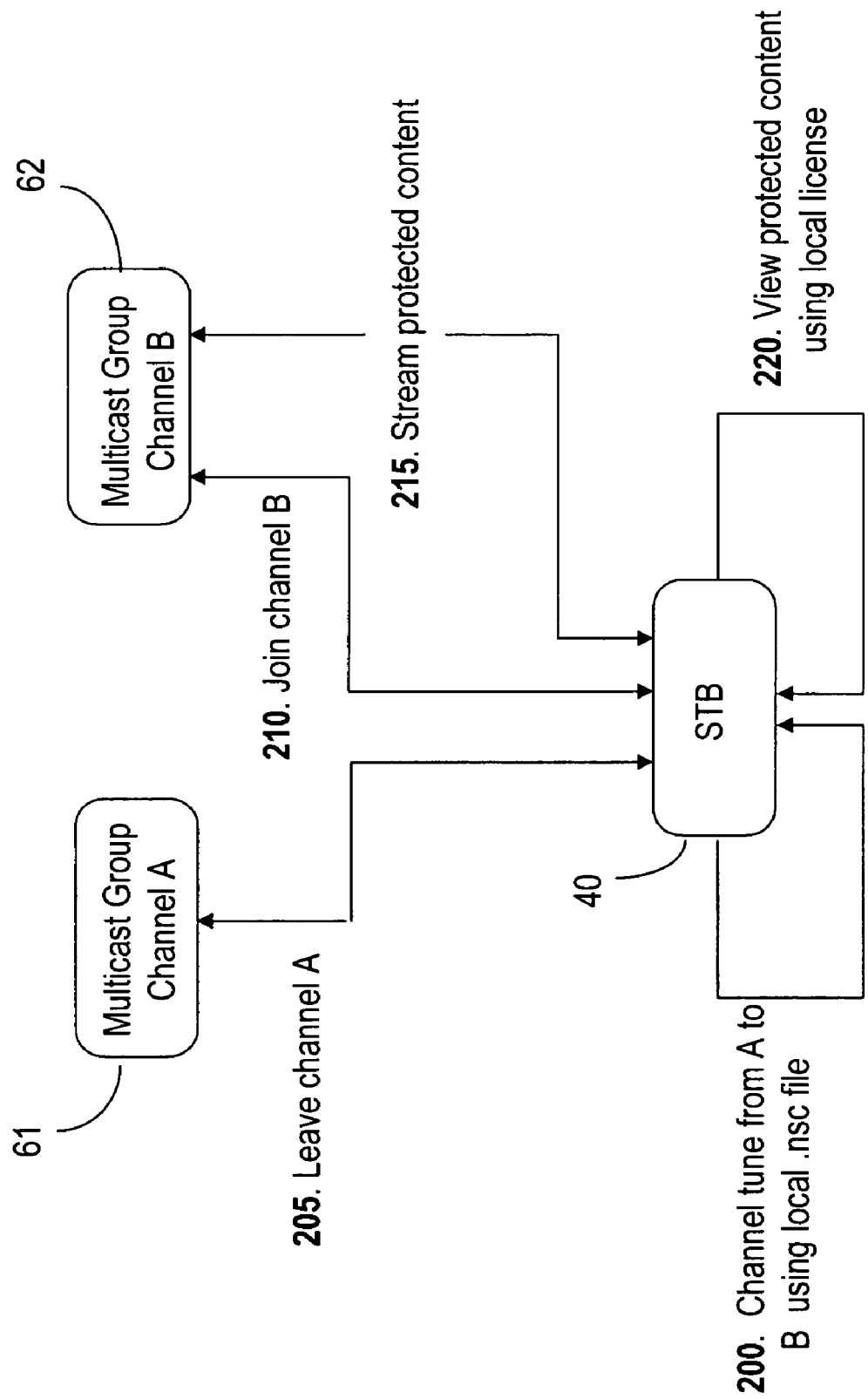
FIG. 5 is a flowchart of a method of tuning the set-top box to a broadcast channel according to the invention.

FIG. 5 is a flowchart of the method of tuning the STB to a broadcast channel according to the invention. First, as shown in step 200, the subscriber tunes the STB from, let's say channel A to a new channel B. The local .nsc files are used by the STB codec to determine how to leave/join the appropriate multicast groups. OMP server 30 business rules are applied (e.g. rules for parental control, subscribed/unsubscribed status, etc). If valid, the channel tune process continues. This operation is performed fast, since the .nsc files containing the information specific for connecting and playing a multicast stream for channel B (multicast IP group address, multicast port, stream format, and other station settings pertinent to channel B) are available locally rather than having to access the .nsc server at the head end 1 (which may be located far away from the subscriber terminal) for downloading this information.

Next, in step 205, the STB uses the appropriate .nsc file to leave a multicast group 61, that includes the current channel A, in other words it leaves the stream carrying the content of channel A. Based on the multicast IP group address and multicast port for channel B from the respective .nsc file determined in step 200, the subscriber terminal 40 joins the multichannel group 62 including the new channel B, step 210, for retrieving the multicast stream channel B. Now, the channel B content is streamed to the subscriber terminal, step 215, where it is decoded and displayed on the respective display 6. The codec on the STB determines that the content is protected and checks locally for a valid license; the content streamed on channel B is protected, so that the subscriber may view it only if he/she has the respective license, as shown in step 220. The license that was previously delivered is used to view the content.

Figure 6:
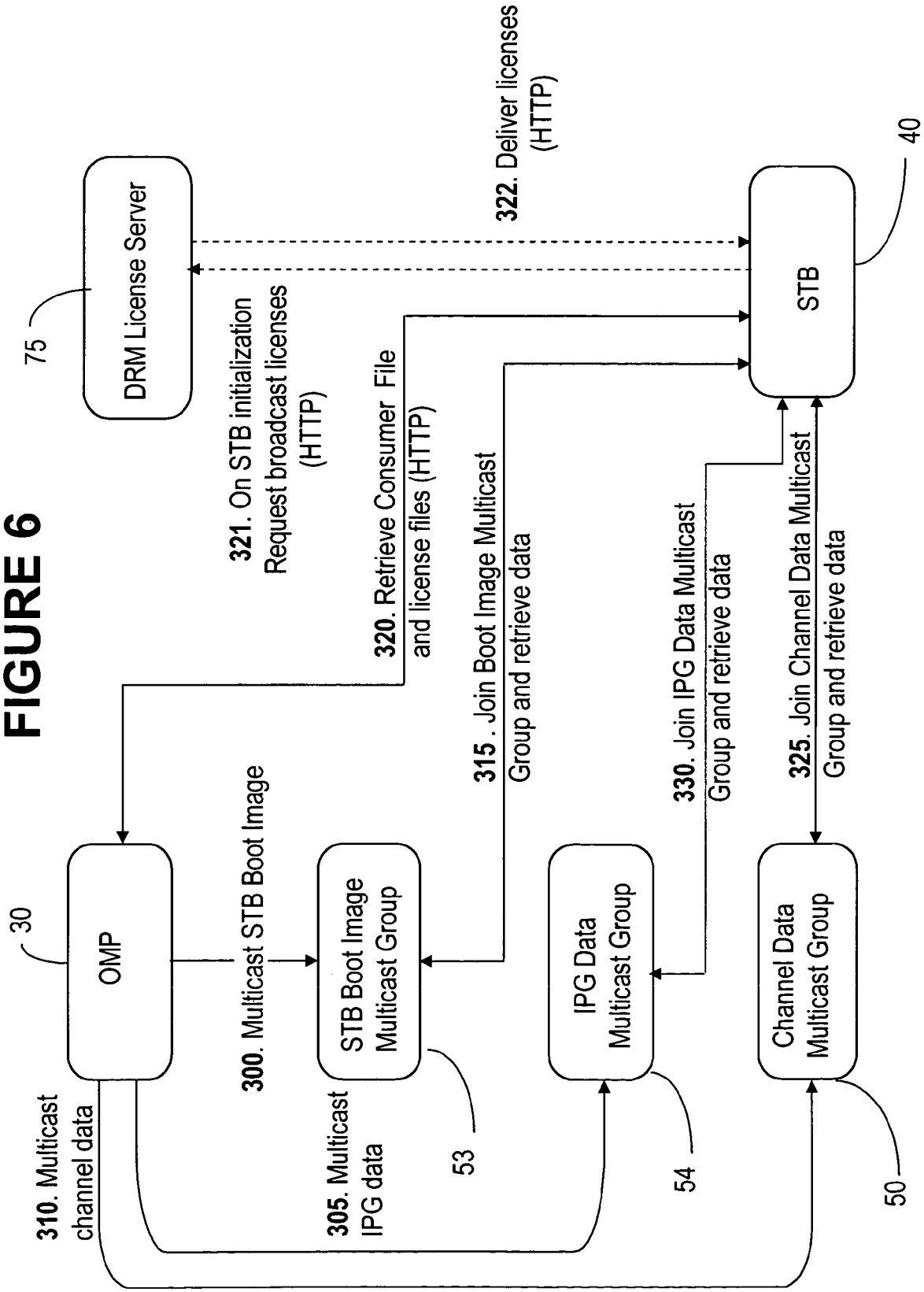
FIG. 6 is a flowchart of a method of booting the set-top box according to the invention.

FIG. 6 is a flowchart of the method of booting a STB according to the invention. Server 30 multicasts a STB boot image, as shown in step 300, the IPG (interactive program guide) data, as shown in step 305, and the channel data, as seen in step 310, all to be retrieved by the STB on boot-up. On boot, the STB joins the STB boot image multicast group 53 to retrieve the boot image, step 315, and STB also retrieves the consumer specific files from server 30 using HTTP, as shown by step 320.

The consumer specific files may also include the license files that have been cached as licenses have been issued over time. If this is the initial boot of the STB (registration) the STB may for example request that all valid broadcast licenses be issued based on the consumer's subscriptions. In an exemplary scenario, shown by dotted lines on FIG. 6, the STB initiates a background HTTP request to the license server 75 (see FIG. 3) for all valid licenses, as shown by step 321. The request should preferably include the unique ID of the device 40, as well as the request type. Upon receiving the License Request, the license server 75 requests OMP server 30 to provided authentication/authorization for the respective device 40 identifying the channels which the consumer has the right to use. The license server 75 passes the unique ID of the STB and the license request type to OMP server 30, as shown in step 322.

On boot, the STB also joins the channel data multicast group 50 to retrieve the channel data, as shown in step 325, and joins the IPG data multicast group 53 to retrieve the current IPG data, step 330.

We claim:

1. A method of delivering broadcast channels to subscriber terminals over a broadband network, each broadcast channel comprising a multicast data stream, the method comprising:

storing at each subscriber terminal a set of .nsc files, each .nsc file comprising information necessary for accessing and playing a respective broadcast channel that is part of a current channel line-up available at each subscriber terminal;

receiving at each subscriber terminal a multicast notifier advertising a new broadcast channel, and providing a multicast address for a channel data multicast group, including channel data for said new broadcast channel;

joining said channel data multicast group for retrieving the channel data for said new broadcast channel including a new .nsc file, wherein said new .nsc file is stored locally at each subscriber terminal for accessing and playing said new broadcast channel.

2. The method of claim 1, further comprising:

accessing said new .nsc file for obtaining the multicast IP group address, multicast port, from which to obtain said new broadcast channel; and playing said new broadcast channel based on the video, audio and stream format information from said .nsc file.

3. The method of claim 1, wherein said channel data includes video, audio, stream format information and various station settings, and specific information for connecting and playing a multicast stream.

4. The method of claim 3, wherein said specific information includes the multicast IP group address and multicast port for all broadcast channels in said current channel line-up.

5. The method of claim 1, wherein the channel data includes the broadcast channels in the current channel line-up mapped to multicast addresses necessary to receive the respective multicast data stream for these broadcast channels.

6. The method of claim 1, further comprising switching each subscriber terminal to from a first broadcast channel to a second broadcast channel.

7. The method of claim 6, wherein said step of switching comprises:

tuning each subscriber terminal to from said first broadcast channel to said second broadcast channel, using a respective locally stored first and second .nsc files;

leaving a first multicast group including said first broadcast channel based on the channel data from said first .nsc file;

joining a second multicast group including said second broadcast channel based in the channel data from said second .nsc file; and streaming a multicast data stream corresponding to said second broadcast channel to each subscriber terminal.

8. The method of claim 7, further comprising viewing said multicast data stream corresponding to said second broadcast channel using a locally stored license for said broadcast channel.

9. The method of claim 1, further comprising retrieving a licence for said new broadcast channel and storing said license locally at each subscriber terminal.

10. The method of claim 1, wherein said multicast notifier is distributed to the edge routers of said broadband network as a broadcast TV channel.

11. The method of claim 1, wherein said channel data multicast group is multicast to each subscriber terminal using Internet Group Management Protocol (IGMP).

12. The method of claim 1, wherein said multicast data stream uses the advanced streaming format (ASF).

13. The method of claim 1, further comprising acquiring said set of .nsc files at said OMP from a .nsc server over an HTTP interface with said broadband network.

14. A method of delivering broadcast channels to subscriber terminals over a broadband network, each broadcast channel comprising a multicast data stream, the method comprising:

providing an open media platform (OMP) for managing a group of subscriber terminals and storing on said OMP a set of .nsc files, each .nsc file comprising information necessary for accessing and playing a respective broadcast channel;

multicasting (110) a channel data multicast group, including channel data for a set of broadcast channel subscribed for by one or more subscriber terminal of said group of subscriber terminals; and broadcasting (115) a multicast notifier with a respective multicast address for said channel data multicast group, wherein each .nsc file comprises information specific for accessing and playing said multicast data stream for the respective broadcast channel.

15. A subscriber terminal for playing broadcast channels received over a broadband network, each broadcast channel comprising a multicast data stream, comprising:

means for storing (9) a set of .nsc files, each .nsc file comprising information necessary for accessing and playing a respective broadcast channel that is part of a current channel line-up available at said subscriber terminal;

means for processing (45) a multicast notifier advertising a new broadcast channel, and providing a multicast address for a channel data multicast group, including channel data for said new broadcast channel;

means for joining (48) said channel data multicast group for retrieving the channel data for said new broadcast channel, including a new .nsc file, wherein said new .nsc file is stored on said means for storing, for enabling accessing and playing said new broadcast channel.

16. An open media platform (OMP) for managing delivery of broadcast channels to a group of subscriber devices over a broadband network, each broadcast channel comprising a multicast data stream, comprising:

means for storing (10) on said OMP a set of .nsc files, each .nsc file comprising information necessary for accessing and playing a respective broadcast channel;

means for multicasting (39) a channel data multicast group, including channel data for a set of broadcast channel subscribed for by one or more subscriber devices of said group of subscriber devices; and means for broadcasting (25) a multicast notifier with a respective multicast address for said channel data multicast group, wherein each .nsc file comprises information specific for accessing and playing said multicast data stream for the respective broadcast channel.

* * * * *